United States Patent [19]
Michalovic

[11] Patent Number: 4,540,152
[45] Date of Patent: Sep. 10, 1985

[54] MULTIPLE PART MOLD INSERT

[75] Inventor: John G. Michalovic, Tonawanda, N.Y.

[73] Assignee: Calspan Corporation, Buffalo, N.Y.

[21] Appl. No.: 636,889

[22] Filed: Aug. 2, 1984

[51] Int. Cl.³ .......................... B29C 1/14; B29C 1/06
[52] U.S. Cl. ..................................... 249/184; 29/428; 29/526 R; 76/4; 76/107 R; 264/219
[58] Field of Search ................. 264/219; 249/52, 122, 249/142, 160, 175, 184; 29/428, 526 R; 76/4, 107 R

[56] References Cited

U.S. PATENT DOCUMENTS

| | | | |
|---|---|---|---|
| 2,274,060 | 2/1942 | Hart | 264/219 |
| 2,830,643 | 4/1958 | Harris | 76/107 R |
| 3,249,672 | 5/1966 | Richards | 264/219 |
| 3,632,695 | 1/1972 | Howell | 264/219 |
| 4,474,722 | 10/1984 | Martin | 264/219 |

Primary Examiner—W. E. Hoag
Attorney, Agent, or Firm—Biebel, French & Nauman

[57] ABSTRACT

A chemical detector employs a very fine serpentine-like groove which is filled with conductive paint, to form an electric circuit. The application discloses a method of making a molded part having such a groove by making a mold insert for a plastic mold in which the mold insert is formed with grooves defining a land pattern which will form the grooves in the molded part. A mold insert is formed with a main block and a pair of side blocks, the main block having twice as many grooves therein as the side blocks so that, when the side blocks are offset with respect to each other, a serpentine-like land pattern is formed in the three blocks.

A method of making the mold insert comprises the forming of a first set of the grooves in the main block and in one of the side blocks, removing the one side block and replacing it with the other side block and forming the second set of grooves in the spaces between the first set of grooves therein, and thereafter repositioning the first and second side blocks so that the grooves therein are offset from the main block by the spacing of one of the grooves, to form the requisite serpentine pattern.

6 Claims, 6 Drawing Figures

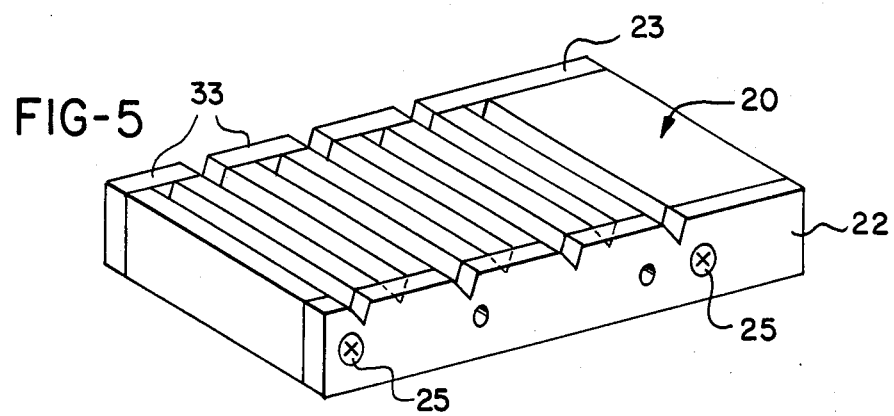
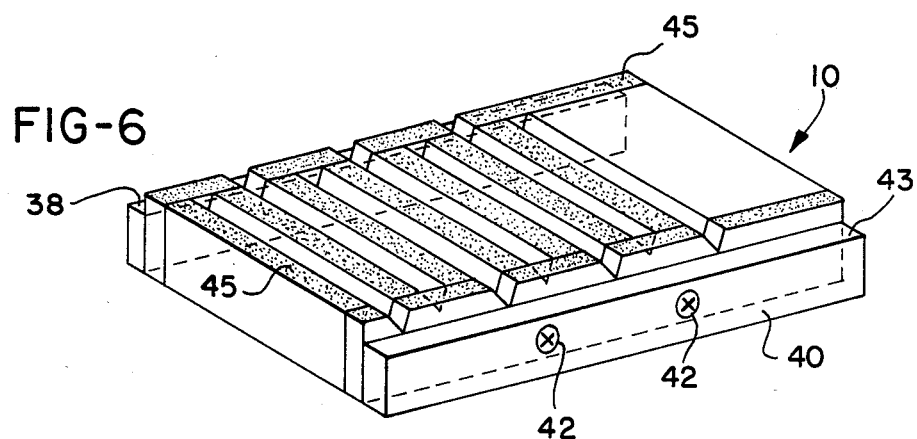

MULTIPLE PART MOLD INSERT

BACKGROUND OF THE INVENTION

For some applications, such as that of precision measuring instruments, it is necessary to form a continuous groove in and over a substantial portion of a surface of the instrument. Such a groove may be desired in those instances where a conductive paint or the like is to be applied to the bottom of the groove, which conductive paint is thereafter responsive to specific chemicals. When a reactive chemical contacts the painted line, the electrical continuity is disrupted, and an electric circuit is thereby opened to indicate the presence of such chemical. In the manufacture of chemical detectors, in which conductive paint or the like is applied to a surface, the use of grooves protects the paint, so that it the continuity is not inadvertently broken by scratching or physical abrasion, as is the case where the paint is applied to an exposed planar surface.

In such instruments, it is desirable to provide a conductive line which is arranged in serpentine-like manner, which has continuity between its ends, and which is formed in closely spaced grooves or the like in a surface of the member. For example, such grooves may be very fine indeed, and could for example be approximately 225 microns deep and approximately as wide, with the center of the grooves spaced apart approximately 375 microns, defining a land area between the adjacent edges of the grooves in the order of 175 microns.

SUMMARY OF THE INVENTION

The invention is directed to method and apparatus for producing a precision serpentine groove in a molded part by producing a series of grooves in a mold to define therebetween a serpentine land or raised area which will form the grooves in the part to be molded. The invention is further directed to such a mold and to the product molded therein.

The process of this invention is realized by the machining of series of grooves in parts of a mold in which plastic will be injected, to form a serpentine-like pattern on the injected part. The serpentine-like pattern on the completed path will itself be a groove, having been defined by land areas formed in the mold, and will have high precision and high density as regards the number of such grooves compared to the land areas therebetween.

In the practice of the method of this invention for making a mold insert for molding an article having a serpentine groove therein, the steps generally comprise forming a first set of parallel and generally evenly spaced transverse grooves in an exposed or upper surface of a main block, defining one of the mold walls, and simultaneously applying or forming said first set of grooves in either one or two removable side blocks. The side blocks are positioned along opposed longitudinal edges of the main block, and transversely to the direction of grooving. The first set of grooves are thus formed by conventional routing or grooving apparatus, while the block is moved in a straight path, so that the first set of grooves are formed completely across the assembled blocks from one edge to the other, so that a first pattern of parallel spaced-apart grooves is formed in the assembled blocks.

If all three blocks have thus been intially grooved, it is now necessary to remove each of the side blocks, lay them aside, and apply a second series of parallel spaced-apart longitudinally extending grooves in the spaces between the first set of grooves, in the exposed surface of the main block, with the result that the main block is formed with two sets of grooves, preferably perfectly evenly spaced from each other. That is, the spacing between the first and second sets and the spacing between the grooves themselves is uniform so that the first block is formed with a groove density which is twice that of the respective side blocks.

If only one of the side blocks was involved in the first grooving step, it must be removed prior to the second grooving step and the second side block applied so that the side blocks have formed therein only a single series of grooves, the spacing of which is approximately twice that of the completed center or main block.

The side blocks are now reapplied to the main block in respective offset relation from each other so that the non-grooved portion on the side blocks form closures to alternate ones of the grooves on the center or main block. In other words, the grooves in the first side block line up with one of the two series of grooves formed in the main block while the grooves in the second side block line up with the other of the series of grooves formed in the main block. The side blocks are now clamped in place. A pair of end plates having upper surfaces aligned with the groove bottoms are fixed to the respective side blocks, to define ungrooved land areas in the molded part beyond the grooves formed by the mold. The land areas on the mold insert formed between the grooves now takes on a serpentine shape, and it is this land area which the mold forms a groove in the completed part. In other words, when a part is molded in such a mold, a high density fine serpentine groove is formed, within which conductive paint or the like may be applied.

The invention is further directed to the apparatus consisting of a mold or mold insert having at least three wall parts which are defined by a center part, and two oppositely positioned side parts, having grooves formed therein as heretofore described.

It is accordingly an object of this invention to provide a simplified method of making a mold which will form a serpentine groove in a completed part.

Another object of the invention is that of the method of forming a serpentine-like non-grooved portion in an otherwise grooved surface of a body, such as the inside surface of an injection mold.

A further object of the invention is the provision of an article molded by such a mold, and the provision of a mold for molding an article having a high density serpentine groove.

These and other objects and advantages of the invention will be apparent from the following description, the accompanying drawings and the appended claims.

BRIEF DESCRIPTION OF THE DRAWINGS

FIG. 5 shows the mold parts after the first side block has been repositioned in offset relation to the second side block, on the main body; and FIG. 6 shows the structure of FIG. 5 after end plates have been established and mounted on the mold to define the outer perimeter of the molded part, with the shaded area thereon diagrammatically illustrating the path of the groove which will be formed in the molded part.

DESCRIPTION OF THE PREFERRED EMBODIMENT

Figure 1:
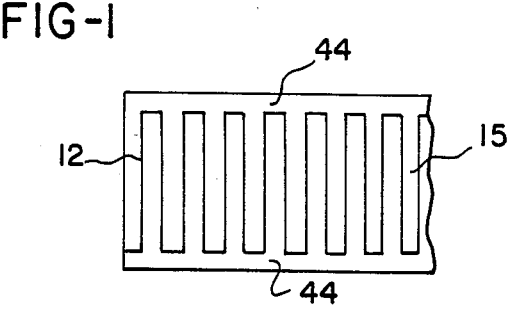
FIG. 1 is a fragmentary view of a serpentine groove which is formed in a molded product by the method of this invention.

Referring to the figures of the drawing, which illustrate the steps of the preferred process and which illustrate the preferred embodiment of the mold according to this invention, a five part completed mold insert is shown at 10 in FIG. 6, which will form, in the surface of a molded part, a high density or closely packed serpentine like pattern as shown, for example, by the pattern 12 formed in the part 15 of FIG. 1.

Figure 2:
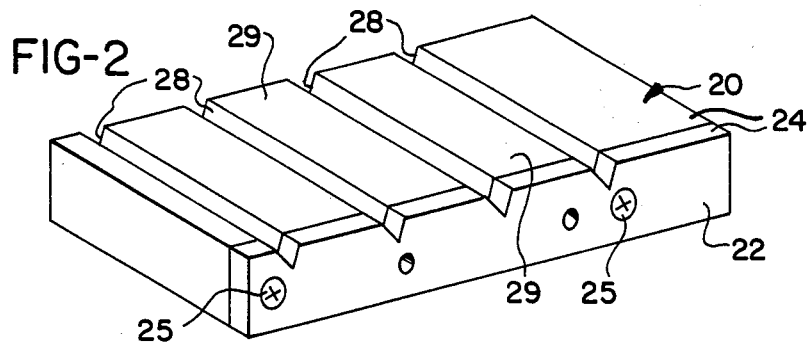
FIG. 2 shows a first set of grooves formed in a main or center mold body and one of the side blocks.
Figure 3:
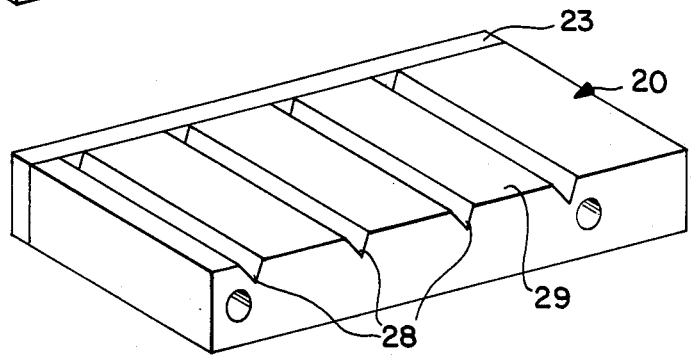
FIG. 3 is a view similar to FIG. 2 showing the first side block removed and a second non-grooved side block attached prior to grooving.

The five-part die of the present invention includes a main or center body 20 and a pair of oppositely disposed side parts or blocks 22 as shown in FIG. 2 and 23 as shown in FIG. 3. The side parts are removably attached to and are contiguous with an opposite longitudinal side edges of the body 20, are formed with common exposed upper surface 24, when so attached, and are secured such as by the machine screws 25 along such opposite sides.

In the practice of the invention, at least one of the side blocks is attached to the main block with its surface co-planar with that of the main block, as shown with respect to the side block 22 and the main block 20 of FIG. 2. A first set of transversely extending evenly spaced parallel grooves 28 is then formed in the assembled blocks. The grooves 28 are spaced apart a sufficient distance leaving land areas 29 therein which will accommodate a second series of such parallel longitudinally extending grooves. As shown in FIG. 2, the first set of grooves 28 traverses the entire width of the assembled blocks 20 and 22.

Figure 4:
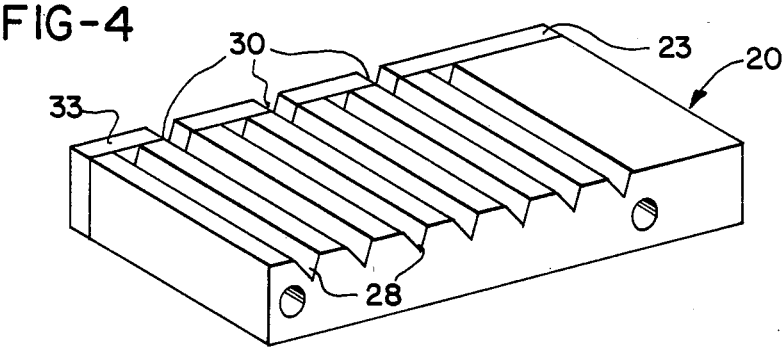
FIG. 4 shows the main body portion and the second side block after a second series of grooves have been formed.

Following the machining of the first series of grooves or pattern of grooves 28, as shown in FIG. 2, the block 22 is removed. If the block 23 has been grooved at the same time, it is also removed. However, if it has not been grooved at the same time, it is now a blank block and is attached as shown in FIG. 3. At this time, the second series 30 of essentially identical grooves are formed in interdigitated relation or in the space on the land areas 29 between the first series 28. The second series 30 is shown in FIG. 4 as being formed in the main block 20 and in the side block 23. The block 20 now has its complete density grooves formed therein comprising the first and second sets 28 and 30, while the side blocks 22 and 23 have half as many grooves formed therein, thereby defining between the grooves the land areas 33 as shown in FIGS. 4 and 5.

The side blocks 22 and 23 are now repositioned on the main block 20 in the manner shown in FIG. 5, with the grooves in each of the side blocks lining up with one or the other of the two sets of grooves formed in the main block 20, in alternating arrangement. In other words, it would be seen that the grooves in the side block or parts 22 and 23 are in offset relation so that the grooves in one of these parts line up with the first series of grooves, while the grooves in the other part line up with the second series of grooves, thereby forming or positioning the non-grooved portions on the side blocks in such a manner that they form closures to alternate ones of the grooves in the center part.

The five-part mold is now completed by the attachment of end plates 38 and 40 with screws 42. The end plates have upper surfaces 42 which are recessed below the face of the plates 20, 22, and 23, and aligned substantially at the depths of the grooves. The end plates 38 and 40 thereby form the peripheral land area or non-grooved area on the completed part 15, as shown at 44 in FIG. 1. FIG. 6 illustrates by shading 45 the serpentine land surface now defined by the assembled parts 20, 22, and 23, which forms a serpentine path. This will form the conductive material-receiving groove in the molded part.

A typical example, the serpentine groove 12 formed in the part 15 of FIG. 1, constructed according to a mold made according to this invention, could typically have grooves which are approximately 0.014" between the grooves, with grooves which are 0.010" deep, and which have a flat bottom of approximately 0.006" across. Conductive paint may then be applied to the surface of the molded part and polished off, leaving only the paint in the groove as defined above.

While the method herein described, the form of apparatus for carrying this method into effect, and the resulting product constitute preferred embodiments of this invention, it is to be understood that the invention is not limited to this precise method, form of apparatus, or product, and that changes may be made without departing from the scope of the invention, which is defined in the appended claims.

What is claimed is:

1. A method for making a mold insert for molding an article having a serpentine groove, comprising the steps of:
   forming a first set of parallel, evenly spaced transverse grooves in the upper surfaces of a main block, a first side block contiguous with a longitudinal side of said main block, and a second side block contiguous with an opposite longitudinal side of said main block;
   removing said first and second side blocks from said main block;
   forming a second set of parallel, evenly spaced transverse grooves in the upper surface of said main block, said second set of grooves being parallel to and evenly interspaced with said first set of grooves;
   positioning said first side block adjacent to and contiguous with said longitudinal side such that said first set of grooves thereon is aligned and continuous with said second set of grooves on said main block; and
   positioning said second side block adjacent to and contiguous with said opposite longitudinal side such that said first set of groves thereon is aligned and continuous with said first set of grooves on said main block.

2. A method for making a mold insert for molding an article having a serpentine groove, comprising the steps of:
   forming a first set of parallel, evenly spaced transverse grooves in the upper surfaces of a main block, a first side block and a second side block;
   forming a second set of parallel, evenly spaced transverse grooves in the upper surface of said main block, said second set being parallel to and evenly interspaced with said first set;

positioning said first side block contiguous with a longitudinal side of said main block such that said grooves of said first set on said first side block are continuous with said grooves of one of said sets on said main block; and positioning said second side block contiguous with an opposite longitudinal side of said main block such that said grooves of said first set on said second side block are continuous with said grooves of the other of said sets on said main block.

3. Method of making a mold or the like for producing parts having a groove of serpentine configuration, comprising the steps of:

forming a three-part mold with a center part and a pair of removable and transversely positonable side parts, forming in the center part and one of said side parts a first set of generally parallel spaced-apart grooves, removing said one side part and applying to said first part a second end part and forming in said center and second side parts a series of parallel spaced-apart grooves, parallel to said first set of grooves and having the spacing of said first set in the spaces between the first set of grooves, and repositioning said side parts on said center part so that the non-gooved portions on the side parts form closures to alternate ones of the grooves in said center part so that the non-grooved land areas form a serpentine pattern.

4. The method of forming a serpentine pattern in a three-part mold insert consisting of center part A and two side parts B and C, comprising the steps of:

forming a first series of generally parallel longitudinally extending grooves in the surface of at least parts A, B and C leaving a space between each of said grooves for subsequent grooves, forming a second series of generally parallel spaced-apart grooves interdigitated between said first grooves in part A, and assembling parts B and C with resect to part A in respective offset relation so that the gooves in part B line up with said second series of grooves, and the grooves in part C line up with said first series of grooves, thereby defining therebetween a serpentine ungrooved land portion.

5. The product produced by the method of claim 4.

6. A mold for forming a serpentine groove in a part molded therein comprising:

a center part having means defining a plurality of generally parallel spaced-apart grooves formed in a planar surface thereof, extending transversely between side edges thereof, a second part having means defining a plurality of grooves formed therein corresponding in spacing and number to alternate ones of the grooves formed in said center part and positioned at one of the side edges of said center part with its said alternate grooves in alignment with the corresponding grooves in said center part, and a third part having means defining alternate grooves therein corresponding to the spacing of alternate grooves of said first part, and positioned at the opposite side edge of said center part with its alternate grooves in alignment with grooves intermediate those in alignment with said second part, thereby forming between said grooves a generally serpentine land portion forming the shape of a groove to be formed in a molded part.

* * * * *